(12) United States Patent
Smaini et al.

(10) Patent No.: US 10,666,471 B2
(45) Date of Patent: May 26, 2020

(54) SYSTEMS AND METHODS FOR REDUCING INTER-CARRIER INTERFERENCE IN DEVICE-TO-DEVICE (D2D) COMMUNICATION

(71) Applicant: Apple Inc., Cupertino, CA (US)

(72) Inventors: Lydi Smaini, San Jose, CA (US); Tarik Tabet, San Jose, CA (US); Ronald W. Dimpflmaier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/132,697

(22) Filed: Sep. 17, 2018

(65) Prior Publication Data

US 2020/0092145 A1 Mar. 19, 2020

(51) Int. Cl.
*H04L 25/03* (2006.01)
*H04W 72/04* (2009.01)
*H04L 5/00* (2006.01)

(52) U.S. Cl.
CPC .. *H04L 25/03821* (2013.01); *H04L 25/03159* (2013.01); *H04W 72/0453* (2013.01); *H04L 5/001* (2013.01)

(58) Field of Classification Search
CPC ............... H04L 5/001; H04L 25/03159; H04L 25/03821; H04W 72/0453
See application file for complete search history.

(56) References Cited

U.S. PATENT DOCUMENTS

| 9,538,517 | B2 | 1/2017 | Baldemair et al. | |
| 10,404,212 | B1* | 9/2019 | Connell | ................ H03D 7/1483 |
| 2010/0027492 | A1* | 2/2010 | Asanuma | .............. H04L 5/0007 370/329 |
| 2017/0064685 | A1 | 3/2017 | Rico Alvarino et al. | |
| 2018/0097676 | A1* | 4/2018 | Kazmi | .................. H04L 5/0007 |

FOREIGN PATENT DOCUMENTS

| EP | 3 193 481 A1 | 7/2017 |
| WO | 2018/048187 A1 | 3/2018 |

* cited by examiner

*Primary Examiner* — David B Lugo
(74) *Attorney, Agent, or Firm* — Fletcher Yoder PC

(57) ABSTRACT

Systems, methods, and devices are provided for reducing and/or eliminating impact of inter-carrier interference on wireless signals transmitted and received via off-grid radio communications (e.g., Device-to-Device (D2D) communication). The method may include using circuitry to generate a plurality of subcarriers associated with a data signal, such that the plurality of subcarriers transmit the data signal along a narrowband transmission channel. The method may involve using the circuitry to remove a null subcarrier of the plurality of subcarriers that is located at a direct current (DC) frequency. The method may also involve generating an asymmetrical frequency spectrum for a portion of the plurality of subcarriers centered about the removed null subcarrier. The method may also include transmitting the plurality of subcarriers to another electronic device via D2D communication.

18 Claims, 6 Drawing Sheets

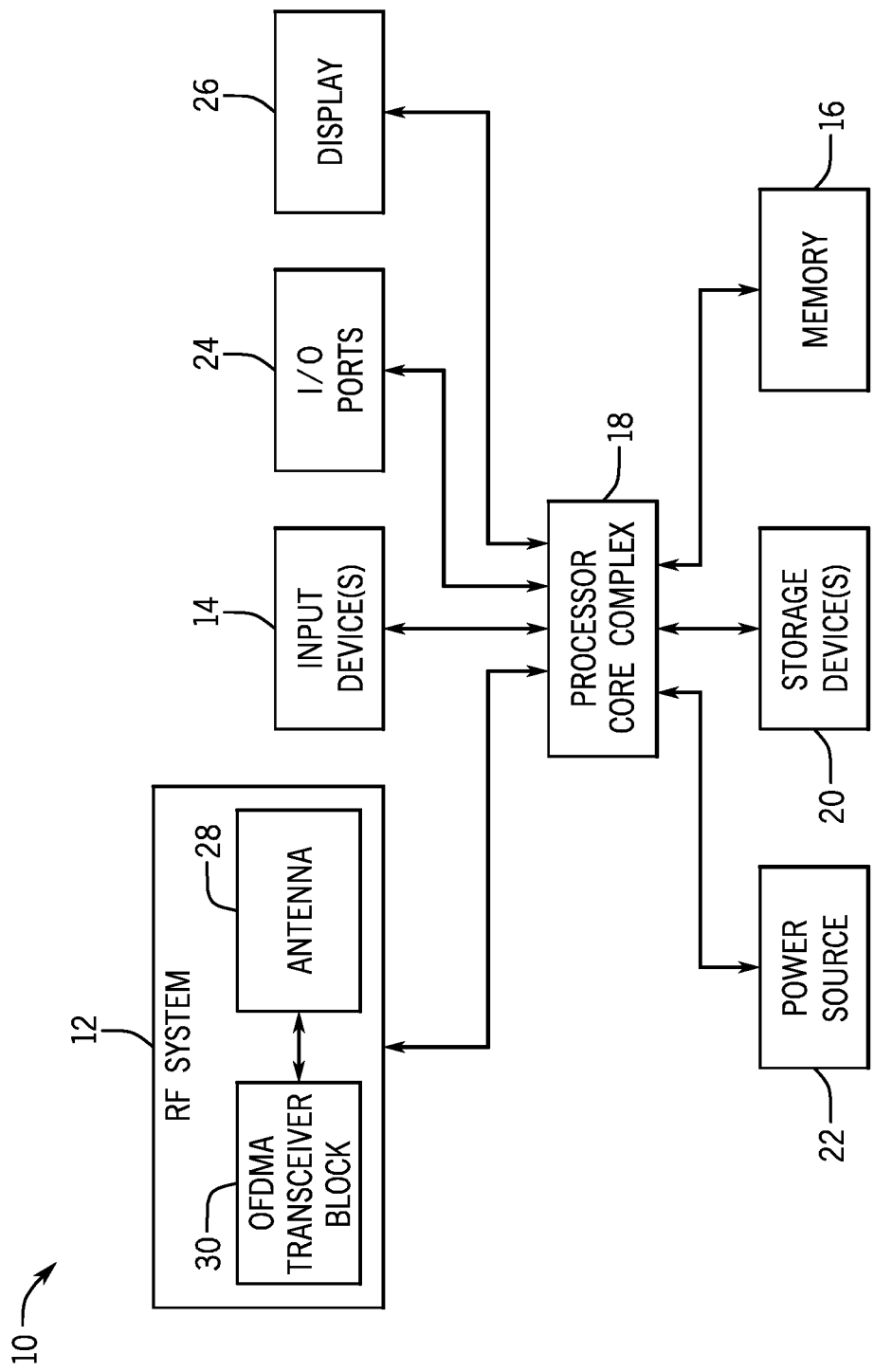

SYSTEMS AND METHODS FOR REDUCING INTER-CARRIER INTERFERENCE IN DEVICE-TO-DEVICE (D2D) COMMUNICATION

BACKGROUND

The present disclosure relates generally to radio frequency systems and, more particularly, to mitigating inter-carrier interferences between wireless signals received during off-grid communication (e.g., Device-to-Device communication).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as smartphones and laptops, often include a radio frequency system to facilitate wireless communication of data with other electronic devices and/or networks. To facilitate wireless communication, the radio frequency system may communicate with a Base Transceiver Station (e.g., base station (BS), node B (eNB), cell tower) that connects the electronic device to a wider mobile network. For example, the electronic device may transmit wireless signals to the Base Transceiver Station, which may, in turn, direct the wireless signals to a receiving electronic device. In some instances, the radio frequency system may employ Device-to-Device (D2D) communication to directly communicate data to another electronic device without traversing the Base Transceiver Station (e.g., off-grid communication). Signal leakage and performance variations (e.g., tolerances) of radio frequency architecture used to facilitate D2D communication, however, may introduce errors during processing of received wireless signals. These errors may result in interference of wireless signals carried (e.g., received and/or transmitted) on a channel and potential loss of information encoded in the wireless signals due to the interference.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to mitigating inter-carrier interference arising from signal leakage and receiver architecture tolerances in off-radio communication systems. Radio frequency (RF) systems may use Device-to-Device (D2D) communication to directly communicate between electronic devices without traversing a Base Transceiver Station. To improve D2D communication efficiency, the channel (e.g., frequency band) used to transmit and receive signals may be divided into multiple subcarriers that may each carry (e.g., transmit and/or receive) wireless signals of an electronic device. However, in some embodiments, component variations of a receiving electronic device's receiver architecture may introduce errors (e.g., in-phase and quadrature-phase (IQ) mismatch) during processing of the wireless signals received via D2D. In some instances, the processing errors may result in interference (e.g., inter-carrier interference) between wireless signals carried on different subcarriers of the channel, such that reception of the wireless signals is affected.

To more accurately facilitate wireless signal processing, in some embodiments, the location of subcarriers in a channel (e.g., physical resource block) may be adjusted to reduce likelihood of undesired inter-carrier interference between wireless signals communicated via D2D. In some embodiments, a portion of the subcarriers of the channel may be removed (e.g., omitted) and/or subcarrier positions relative to an edge of the channel may be modified. For example, a null direct current (DC) subcarrier that does not carry information may be removed from the physical resource block and a compensating subcarrier may be added to the edge of the physical resource block to maintain the same number of subcarriers per channel, thereby maintaining reception capacity of the channel. Additionally, subcarriers in close frequency proximity to the removed DC subcarrier may be placed at the edges of the channel. By removing the DC subcarrier and/or modifying subcarrier position relative to the DC subcarrier, classical zero-IF receiver architecture may be used to better tolerate DC offset and Flicker noise inherent to CMOS IC transceivers, generally used in modern wireless communication for low-cost and low-complexity, but without solving issue of IQ mismatch creating inter-carrier interference (ICI) and then degrading the system performance.

Additionally, in some embodiments, the subcarriers may be shifted, creating an asymmetric frequency spectrum for the channel that facilitates reduction and/or elimination of inter-carrier interference due to IQ mismatching. For example, in instances where wireless signals transmitted by a transmitting electronic device (e.g., user equipment (UE)) are received by a receiving device on subcarrier K, the wireless signals may leak into subcarrier −K and vice versa due to symmetry of the frequency spectrum. The leakage of signals may distort the wireless signals received on subcarrier K and subcarrier −K. Thus, to eliminate interference between symmetric subcarriers, a portion of the subcarriers may be shifted by some value, such that the subcarriers are asymmetrically placed about a center point (e.g., the removed DC subcarrier) of the channel's frequency spectrum. In this way, the radio frequency system may avoid interference between wireless signals carried on subcarriers of the allotted channel and may fully recover the wireless signals even in the presence of IQ mismatching.

BRIEF DESCRIPTION OF THE DRAWINGS

Various aspects of this disclosure may be better understood upon reading the following detailed description and upon reference to the drawings in which:

FIG. 1 is a block diagram of an electronic device with a radio frequency system, in accordance with an embodiment;

DETAILED DESCRIPTION OF SPECIFIC EMBODIMENTS

Figure 3:
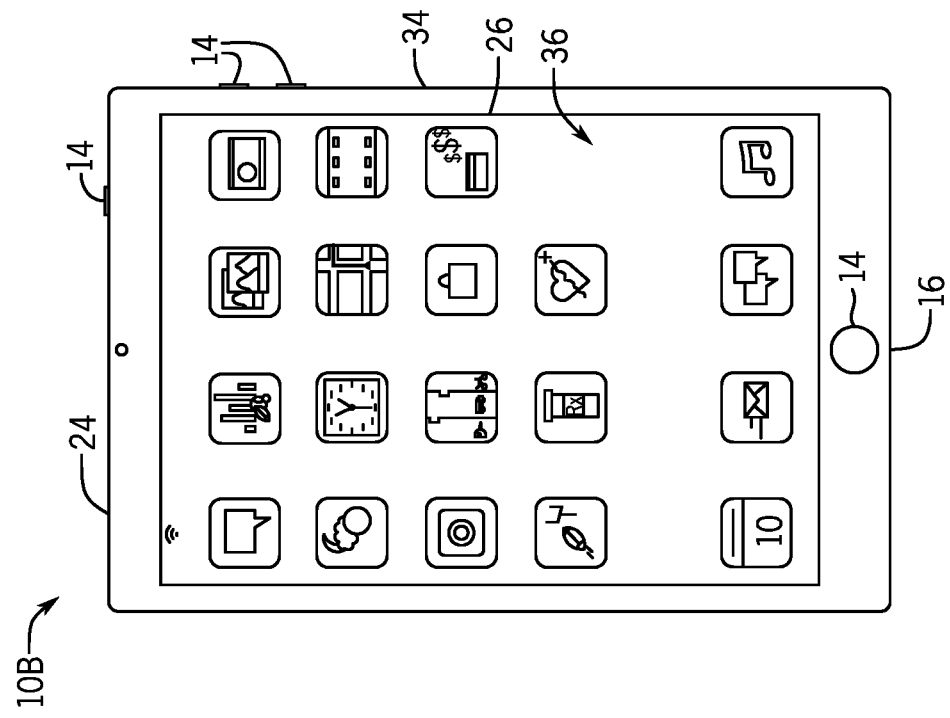
FIG. 3 is a front view of another hand-held device representing another example of the electronic device of FIG. 1, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to radio frequency systems used to facilitate wireless communication of data between electronic devices and/or networks. For example, a radio frequency system may wirelessly communicate data by transmitting wireless signals (e.g., radio waves) modulated in a manner representative of the data, for example, via a personal area network (e.g., Bluetooth network), a local area network (e.g., an 802.11x Wi-Fi network), and/or a wide area network (e.g., a 4G, 5G, or Long Term Evolution (LTE) cellular network).

Generally, the radio frequency system may wirelessly communicate the data to another electronic device and/or network by using an intermediary Base Transceiver Station (e.g., base station (BS), node B (eNB), cell tower) that connects the electronic device to a wider mobile network. For example, the electronic device may transmit wireless signals to the Base Transceiver Station via an uplink channel that connects the electronic device to the Base Transceiver Station. The electronic device may transmit the wireless signals over different network standards, such as Bluetooth and LTE. As another example, the Base Transceiver Station may direct the wireless signals to a receiving electronic device via a downlink that connects the Base Transceiver Station to the receiving electronic device. In this manner, the Base Transceiver Station may facilitate wireless communication between the transmitting electronic device and receiving electronic device.

Additionally or alternatively, the electronic devices may employ Device-to-Device (D2D) communication to directly communicate with other in-range electronic devices without traversing the Base Transceiver Station. For example, in areas with no cellular coverage, an electronic device may communicate with another electronic device up to a few kilometers away using network standards like LTE. D2D may employ direct conversion (DC) receivers that provide multiple advantages over standard wireless communications that use the Base Transceiver Station, such as energy efficiency, data processing efficiency, reduced communication time, and spectral efficiency, among others.

By way of example, DC receivers may include $3^{rd}$ Generation Partnership Project Narrowband Internet of Things (3GPP NB-IoT) that may be optimized to power off-grid radio services, such as D2D communication. Briefly, NB-IoT is a wireless communication standard that is a subset of the LTE standard, and NB-IoT may employ a single narrow-band (e.g., frequency band of 180-200 kHz) to transmit and receive limited amounts of data at low power and over relatively long ranges, such as between electronic devices a few kilometers apart. In particular, transmission and reception of wireless signals on the narrow-band allows the receiver of a receiving electronic device to filter out more signal noise, thereby improving the signal-to-noise ratio (SNR) without using power-consuming filters.

Electronic devices that employ NB-IoT for D2D may transmit wireless signals (e.g., uplink signal) and receive wireless signals (e.g., downlink signal) using similar modulation schemes as that of LTE. During transmission (e.g., uplink communication), NB-IoT may use single-carrier frequency-division multiple access (SC-FDMA) modulation to assign multiple electronic devices (e.g., multiple user equipments (UEs)) to a shared communication resource. That is, each of the multiple transmitting UEs may be pre-assigned (e.g., mapped) to a specific set of frequencies (e.g., a subcarrier) within a range of frequencies (e.g., channel), such that each UE may nearly simultaneously transmit its wireless signals on its allotted subcarrier. For example, the 180 kHz channel bandwidth may be divided into 12 subcarrier that are 15 kHz apart and each subcarrier is mapped to carry wireless signals associated with a different transmitting UE.

During reception (e.g., downlink communication), NB-IoT may use orthogonal frequency-division multiplexing access (OFDMA) modulation due to its ability to compensate for distortion caused by, for example, narrowband interference and multipath fading that may occur during reception of wireless signals. Similar to SC-FDMA, OFDMA may employ frequency-division to divide the 180 kHz narrow-band into 12 subcarriers, which together are referred to as a physical resource block. Frequency division allows the radio frequency system to map a UE to each subcarrier, such that the subcarriers do not overlap and there is no interference between the wireless signals transmitted on each subcarrier. The physical resource block may also be time-divided. As an example, the 12 subcarriers of each physical resource block may be received during one slot of time (e.g., 0.5 ms). Additionally, because the subcarrier signals of the physical resource block are numerous, closely spaced together in the frequency domain, and are received during a single time slot, OFDMA may utilize subcarriers with frequencies orthogonal to one another. That is, the wireless signals may be mapped to subcarrier frequencies that have a phase difference of 90° to avoid interference between wireless signals carried by different subcarriers.

Receivers that receive the wireless signals in accordance with the NB-IoT standards may be implemented using various receiver architectures. For example, the receiver may be implemented using low-intermediate frequency (IF) receiver architecture that converts a received wireless signal to an intermediate frequency prior to further processing by the receiver. Further, the low-IF receiver may shift the null DC subcarrier (e.g., by 100 kHz) to avoid DC offset and flicker noise that may result in inter-carrier interference. Briefly, the null DC subcarrier may be a subcarrier that does not transmit information, but may be used by processing algorithms, such as fast Fourier transform (FFT), to locate the position of a subcarrier in the frequency spectrum of a physical resource block. DC offset and flicker noise may result in the leakage of wireless signals onto the DC subcarrier, thereby affecting modulation accuracy and resulting in the interference (e.g., inter-carrier interference) between received wireless signals.

Although low-IF receiver architecture may avoid inter-carrier interference due to the ability to shift the DC subcarrier position, low-IF receiver may be more expensive and complicated than zero-IF receivers (e.g., DC receiver). In particular, unlike low-IF receivers, zero-IF receiver architecture may convert a received wireless signal to an appropriate processing frequency without using an intermediate frequency. Zero-IF receivers, however, may be more sensitive to DC offset and Flicker noise than low-IF receivers, since the zero-IF architecture relies on the null DC subcarrier to center the frequency spectrum. As mentioned above, the DC subcarrier may experience interfering signals due to leakage of wireless signals carried on other subcarriers. The interference may result in distortion of the received wireless signals.

Further, because of tolerances in manufacturing of zero-IF receiver components, such as filters and mixers, unintentional IQ mismatching of wireless signals may contribute to the interference between and distortion of the received wireless signals. As an example, during transmission, a 90° phase shift may be introduced between the in-phase portion of the wireless signal and the quadrature-phase portion of the wireless signal. The in-phase portion and the quadrature-phase portion may be processed using separate filters and mixers, which, due to their tolerances, may output in-phases and quadrature-phases that are no longer shifted by 90° (e.g., are non-orthogonal) with respect to each other. Due to the nature of signals in the frequency domain, the loss of orthogonality between the wireless signals may lead to the projection of wireless signals carried on corresponding symmetric subcarriers (e.g., mirror subcarriers). As a result, the wireless signals mapped onto symmetric subcarriers may distort each other.

Accordingly, the present disclosure provides systems and techniques to reduce inter-carrier interference of received wireless signals arising from signal leakage and processing variations of a receiver. In some embodiments, an OFDMA transceiver may employ zero-IF receiver architecture to receive wireless signals transmitted via off-grid communication, such as D2D. The OFDMA transceiver may divide the narrow transmission and reception band (e.g., physical resource block) in the frequency domain and the time domain to create 12 subcarriers per physical resource block for efficient transmission and reception of data between electronic devices.

In some embodiments, the location of subcarriers in a physical resource block may be adjusted to reduce likelihood of undesired inter-carrier interference between wireless signals communicated via D2D. That is, a portion of the subcarriers of the physical resource block may be removed (e.g., omitted) and/or subcarrier positions relative to an edge of the physical resource block may be modified. For example, a null direct current (DC) subcarrier that does not carry information may be removed from the physical resource block and a compensating subcarrier may be added to the edge of the physical resource block to maintain the same number of subcarriers per resource block (e.g., maintain reception capacity). Additionally, subcarriers in close frequency proximity to the removed DC subcarrier may be placed (e.g., remapped) at the edges of the resource block. By removing the DC subcarrier and/or modifying subcarrier position relative to the DC subcarrier, receiver architecture (e.g., zero-IF architecture, DC receiver) with relatively relaxed IQ matching constraints may be used to better tolerate IQ mismatching. Further, by removing the DC subcarrier and remapping additional subcarriers, leakage of signals carried by non-DC subcarriers onto the DC subcarrier may be mitigated, thereby reducing or eliminating impact of inter-carrier interference on the wireless signals.

Additionally, in some embodiments, the subcarriers may be shifted, creating an asymmetric frequency spectrum for the physical resource block that facilitates reduction and/or elimination of inter-carrier interference due to IQ mismatch. For example, in instances where wireless signals transmitted by a transmitting electronic device (e.g., user device) are received by a receiving device on subcarrier K, the wireless signals may leak into a mirror subcarrier −K and vice versa due to symmetry of the frequency spectrum. The leakage of signals may distort the wireless signals received on subcarrier K and subcarrier −K. To eliminate interference between symmetric subcarriers, a portion of the subcarriers may be shifted by some value, such that the subcarriers are asymmetrically placed about a center point (e.g., the removed DC subcarrier) of the resource block's frequency spectrum. For example, the subcarrier K may remain allotted to a UE and wireless signals transmitted on subcarrier −K may be shifted to subcarrier −K+/−0.5. The shift may be determined based on an estimation of the frequency offset that will correctly space subcarriers to reduce inter-carrier interference. In this way, the radio frequency system may avoid interference between wireless signals carried on subcarriers of the allotted channel and may fully recover the wireless signals even in the presence of IQ mismatching. Additional details with regard to the gain adjustments performed using the embodiments described herein are detailed below with reference to FIGS. 1-11.

By way of introduction, an embodiment of an electronic device 10 that includes a radio frequency system 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the radio frequency system 12, one or more input devices 14, local memory 16, a processor core complex 18, one or more storage devices 20, a power source 22, one or more input/output ports 24, and an electronic display 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 16 and the storage device 20 may be included in a single component.

As depicted, the processor core complex 18 is operably coupled with local memory 16 and the storage device 20. Thus, the processor core complex 18 may execute instruction stored in local memory 16 and/or the storage device 20 to perform operations, such as instructing the radio frequency system 12 to communicate with another electronic device and/or a network. As such, the processor core complex 18 may include one or more general purpose microprocessors, one or more application specific processors (ASICs), one or more field programmable logic arrays (FPGAs), or any combination thereof.

In addition to the instructions, the local memory 16 and/or the storage device 20 may store data to be processed by the processor core complex 18. Thus, in some embodiments, the local memory and/or the main memory storage device 20 may include one or more tangible, non-transitory, computer-readable mediums. For example, the local memory 16 may include random access memory (RAM) and the main memory storage device 20 may include read only memory (ROM), rewritable non-volatile memory such as flash memory, hard drives, optical discs, and the like.

As depicted, the processor core complex 18 is also operably coupled with the I/O ports 24. In some embodiments, the I/O ports 24 may enable the electronic device 10 to interface with other electronic devices. For example, a portable storage device may be connected to an I/O port 24, thereby enabling the processor core complex 18 to communicate data with a portable storage device.

Additionally, as depicted, the processor core complex 18 is operably coupled to the power source 22. In some embodiments, the power source 22 may provide power to one or more components in the electronic device 10, such as the processor core complex 18 and/or the radio frequency system 12. Thus, the power source 22 may include any suitable energy source, such as a rechargeable lithium polymer (Li-poly) battery and/or an alternating current (AC) power converter.

Furthermore, as depicted, processor core complex 18 is operably coupled with the input devices 14. In some embodiments, the input device 14 may facilitate user interaction with the electronic device 10, for example, by receiving user inputs. Thus, the input devices 14 may include a button, a keyboard, a mouse, a trackpad, and/or the like.

Additionally, in some embodiments, the input devices 14 may include touch-sensing components in the electronic display 26. In such embodiments, the touch-sensing components may receive user inputs by detecting occurrence and/or position of an object touching the surface of the electronic display 26.

In addition to enabling user inputs, the electronic display 26 may display image frames, such as a graphical user interface (GUI) for an operating system, an application interface, a still image, or video content. As depicted, the electronic display 26 is operably coupled to the processor core complex 18. In this manner, the electronic display 26 may display image frames based at least in part on image data received from the processor core complex 18.

As depicted, the processor core complex 18 is also operably coupled with the radio frequency system 12. As described above, the radio frequency system 12 may facilitate wireless communication of data with another electronic device and/or a network. For example, the radio frequency system 12 may enable the electronic device 10 to communicatively couple to a personal area network (PAN), such as a Bluetooth network, a local area network (LAN), such as an 802.11x Wi-Fi network, and/or a wide area network (WAN), such as a fourth-generation wireless technology (4G), 5G, or LTE cellular network. In other words, the radio frequency system 12 may enable wirelessly communicating data using various communication protocols and/or at various output powers (e.g., strength of transmitted analog electrical signals).

As mentioned previously, the radio frequency system 12 may be implemented to directly communicate with other electronic devices that are within range without traversing the Base Transceiver Station. To facilitate direct D2D communication, the radio frequency system 12 may be tailored to support transmission and reception of wireless signals via certain wireless technologies. In one embodiment, the radio frequency system 12 may include hardware and/or software that support 3GPP NB-IoT wireless technology. Thus, in some embodiments, the radio frequency system 12 may include an antenna 28 to transmit and receive wireless signals.

The antenna 28 may be coupled to an OFDMA transceiver block 30 that facilities wireless signal transmission and reception in accordance with NB-IoT wireless technology. For example, the OFDMA transceiver block 30 may employ a zero-IF receiver architecture that may demodulate wireless signals received via NB-IoT, all while using fewer components and with reduced cost as compared to low-IF receiver architecture. Further, the OFDMA transceiver block 30 may use OFDMA and FDMA modulation schemes in conjunction with an asymmetric frequency spectrum to avoid distortion of the wireless signals. By way of example, each of the multiple subcarriers may be allocated to a UE and the subcarriers may be asymmetrically placed about a removed null subcarrier to reduce or eliminate interference between subcarriers used to facilitate communication of wireless signals for different UEs.

Figure 2:
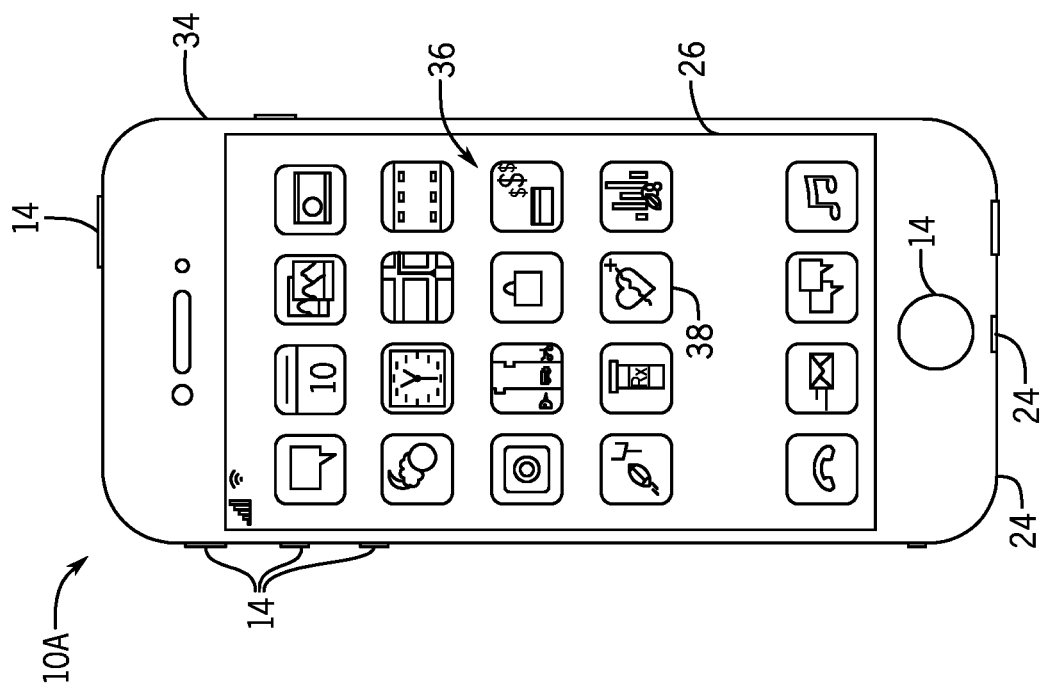
FIG. 2 is a front view of a hand-held device representing an example of the electronic device of FIG. 1, in accordance with an embodiment.

As described above, the electronic device 10 may be any suitable electronic device. To help illustrate, one example of a suitable electronic device 10, specifically a handheld electronic device 10A, is shown in FIG. 2. In some embodiments, the handheld electronic device 10A may be a portable phone, a media player, a personal data organizer, a handheld game platform, and/or the like. For example, the handheld electronic device 10A may be a smart phone, such as any iPhone® model available from Apple Inc.

As depicted, the handheld electronic device 10A includes an enclosure 34 (e.g., housing). In some embodiments, the enclosure 34 may protect interior components from physical damage and/or shield them from electromagnetic interference. Thus, a radio frequency system 12 (not shown) may also be enclosed within the enclosure 34 and internal to the handheld electronic device 10A. In some examples, the enclosure 34 may operate as part of the one or more antenna 28 of the radio frequency system 12.

Additionally, as depicted, the enclosure 34 may surround the electronic display 26. In the depicted embodiment, the electronic display 26 is displaying a graphical user interface (GUI) 36 having an array of icons 38. By way of example, when an icon 38 is selected either by an input device 14 or a touch sensing component of the electronic display 26, an application program may launch.

Furthermore, as depicted, input devices 14 open through the enclosure 34. As described above, the input devices 14 may enable a user to interact with the handheld electronic device 10A. For example, the input devices 14 may enable the user to activate or deactivate the handheld electronic device 10A, navigate a user interface to a home screen, navigate a user interface to a user-configurable application screen, activate a voice-recognition feature, provide volume control, and/or toggle between vibrate and ring modes. As depicted, the I/O ports 24 also open through the enclosure 34. In some embodiments, the I/O ports 24 may include, for example, a multi-function connector port (e.g., Lightning port) to connect to external devices.

Figure 4:
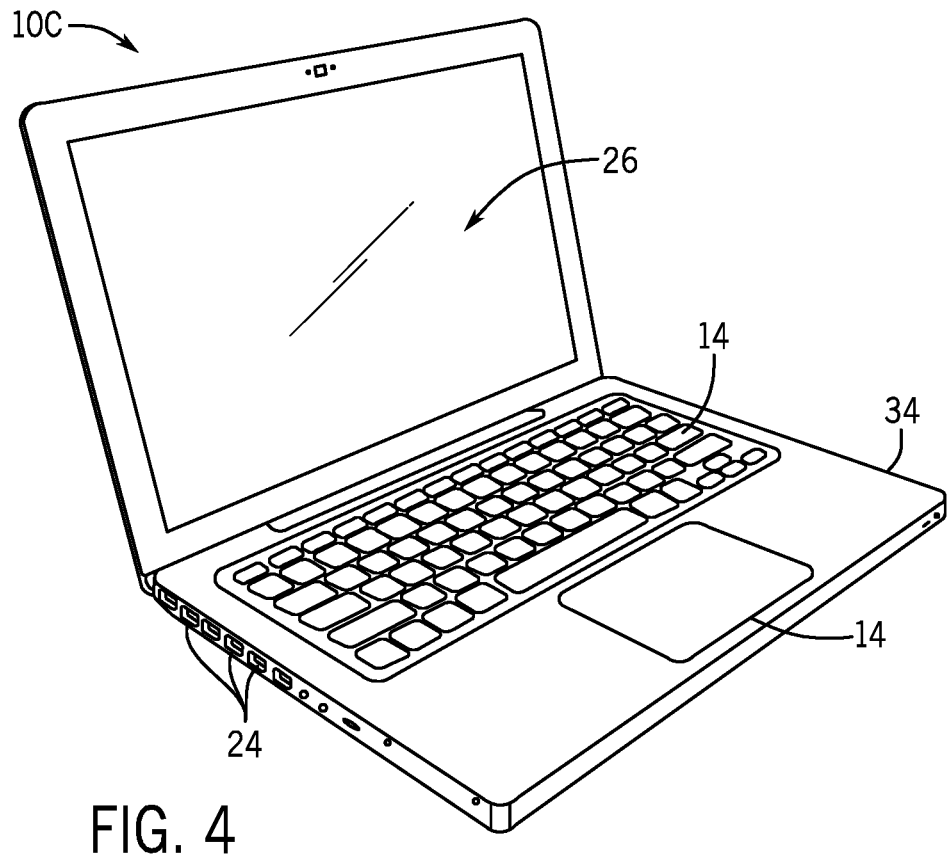
FIG. 4 is a perspective view of a notebook computer representing another example of the electronic device of FIG. 1, in accordance with an embodiment.
Figure 5:
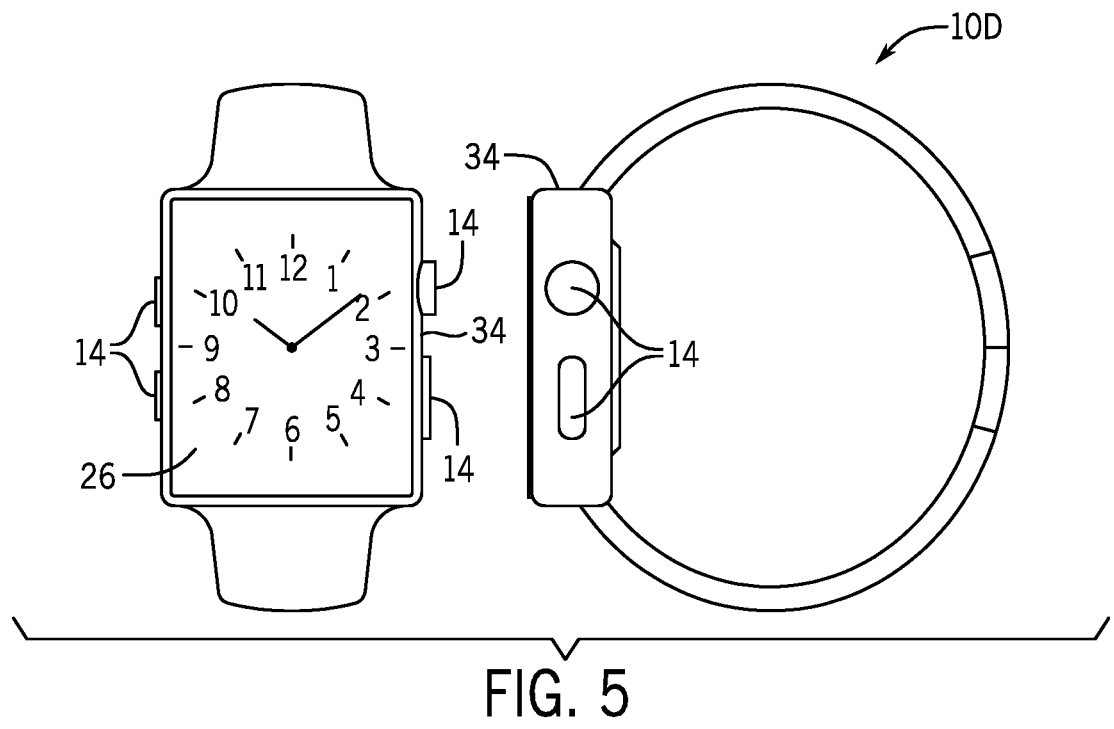
FIG. 5 is a front view of a wearable electronic device representing another example of the electronic device of FIG. 1, in accordance with an embodiment.

To further illustrate, another example of a suitable electronic device 10, specifically a tablet electronic device 10B is shown in FIG. 3. For example, the tablet electronic device 10B may be any iPad® model available from Apple Inc. A further example of a suitable electronic device 10, specifically a computer 10C, is shown in FIG. 4. For example, the computer 10C may be any Macbook® or iMac® model available from Apple Inc. Another example of a suitable electronic device 10, specifically a watch 10D, is shown in FIG. 5. For example, the watch 10D may be any Apple Watch® model available from Apple Inc.

As depicted, the tablet electronic device 10B, the computer 10C, and the watch 10D each also include an electronic display 26, input devices 14, I/O ports 24, and an enclosure 34. Thus, in some embodiments, the enclosure 34 may enclose a radio frequency system 12 in the tablet electronic device 10B, the computer 10C, and/or the watch 10D to facilitate wireless communication of data with other electronic devices and/or a network.

Figure 6:
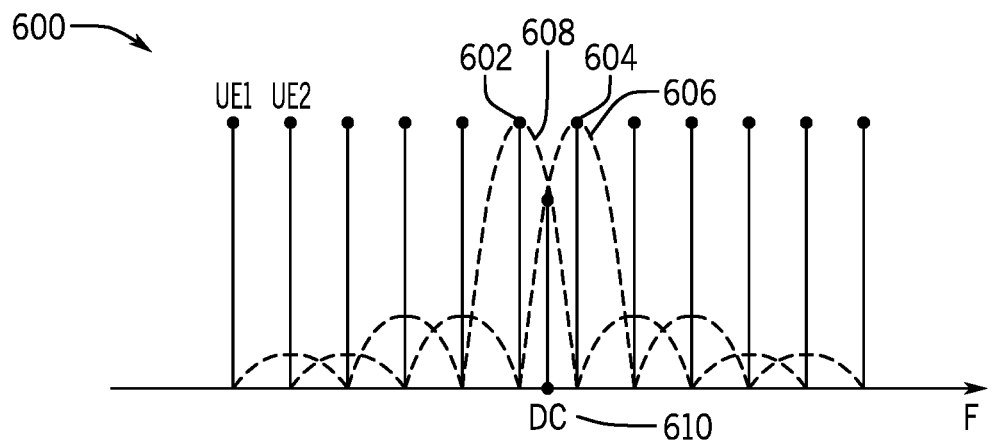
FIG. 6 is a schematic of a frequency spectrum illustrating a DC offset at a null subcarrier, in accordance with an embodiment.

Keeping the preceding discussion in mind, FIG. 6 depicts, via a frequency spectrum 600, a DC offset that may cause inter-carrier interference and distortion of received wireless signals, in accordance with an embodiment. During D2D communication, the OFDMA transceiver block 30 may modulate transmitted and received wireless signals according to FDMA and OFDMA, respectively. In both FDMA and OFDMA, the OFDMA transceiver block 30 may divide a narrow channel band (e.g., physical resource block of ~180 kHz) into multiple subcarriers (e.g., 12) that may each carry a signal associated with user equipment UE. As shown, subcarriers 602 and 604 may each carry wireless signals (e.g., 608 and 606, respectively) for an associated UE. In instances where the OFDMA transceiver block 30 uses a null DC subcarrier 610, the DC subcarrier 610 may be used to locate the center of the channel band, and in this case, the physical resource block. As such, the DC subcarrier 610 may not carry any information.

The wireless signals 606, 608, however, make leak onto the DC subcarrier 610, such that the DC subcarrier 610 now carries some interference wireless signals (e.g., mixture of wireless signals 606 and 608 at the DC subcarrier 610), an issue referred to as an DC offset. As shown, a leakage current may occur at the DC subcarrier 610 frequency. In some instances, the DC offset may be caused by the DC subcarrier 610 overlapping with DC voltages used to bias radio frequency hardware. Regardless, DC offset may be difficult to remove and may reduce accuracy of modulation and demodulation schemes used by the OFDMA transceiver block 30 to accurately receive wireless signals. Further, the DC offset may result in inter-carrier interference that significantly distorts received wireless signals.

Figure 7A:
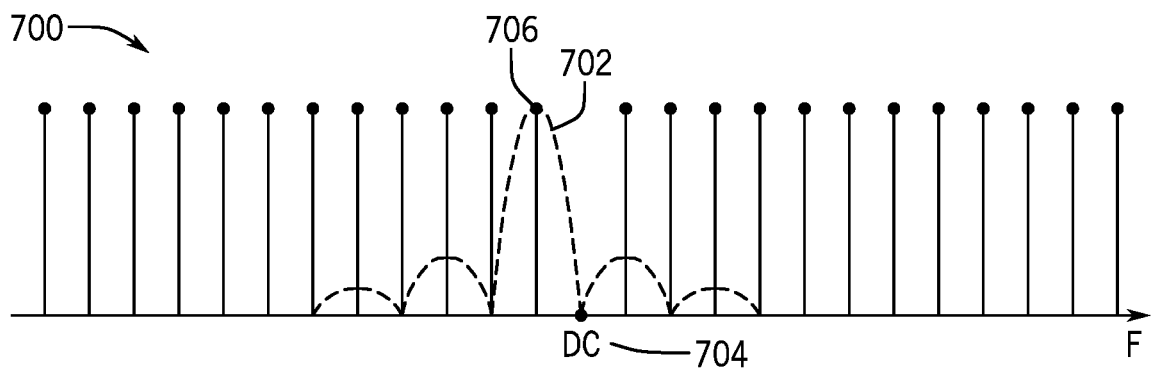
FIG. 7A is a schematic of another frequency spectrum depicting compensation of the DC offset by removing of the null subcarrier of FIG. 6, in accordance with an embodiment.

To avoid the DC offset and issues it may cause, the null DC subcarrier 610 may be removed (e.g., omitted) from the frequency spectrum. FIG. 7A depicts a frequency system 700 for multiple physical resource blocks without a DC subcarrier 704, in accordance with an embodiment. To remove a DC subcarrier 704, a transmitting electronic device may not transmit a subcarrier at the center of the band and the OFDMA transceiver block 30 may not receive a subcarrier at the band center. In particular, the wireless signal 702 of a UE may peak at the subcarrier 706 and be null at the removed DC subcarrier 704, such that a sum of the signals at the DC frequency is null. By omitting the DC subcarrier 704, wireless signal reception requirements may be relaxed, enabling implementation of zero-IF receivers. For example, the IQ mismatching requirements may be relaxed, since omitting the DC subcarrier 704 allows for better tolerance of IQ mismatching.

Figure 7B:
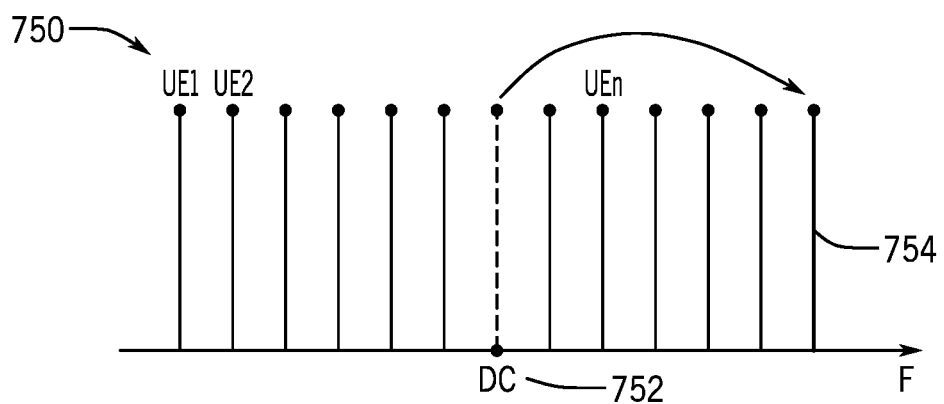
FIG. 7B is a schematic of another frequency spectrum illustrating an addition of a compensating subcarrier at the edge of a channel to maintain reception capacity, in accordance with an embodiment.

Further, a compensating subcarrier may be added to the edge of the physical resource block to maintain the same number of subcarriers per resource block (e.g., maintain reception capacity), as shown by a frequency spectrum 750 of FIG. 7B, in accordance with an embodiment. In particular, the DC subcarrier 752 may be removed and a compensating subcarrier 754 may be added to edge of the physical resource block (e.g., at 100 kHz) to maintain reception capacity by maintaining 12 subcarriers. Furthermore, in some embodiments, several subcarriers in close frequency proximity to the removed DC subcarrier 752 may also be removed and placed at the edges of the physical resource block, subject to spacing constraints between the subcarriers. The removal of several subcarriers may create a larger gap around the DC subcarrier frequencies, further mitigating impact of DC offset on OFDMA transceiver block 30 performance. As such, by removing the DC subcarrier 752 and/or modifying subcarrier position relative to the DC subcarrier, IQ matching constraints may be relaxed and impact of DC offset and flicker noise on the wireless signals may be reduced.

Although modification of the included subcarrier and/or subcarrier position relative to the DC subcarrier 610 may result in better tolerance to IQ mismatching, IQ mismatching inherent to zero-IF architecture may still cause inter-carrier interference. As previously discussed, IQ mismatch may occur due to receiver component tolerances that introduce variations/errors during processing of received wireless signals. The IQ mismatch may cause the received wireless signals to become non-orthogonal with respect to each other. Because of the loss of orthogonality, the wireless signals may project onto each other in the frequency domain resulting in inter-carrier interference.

Figure 8:
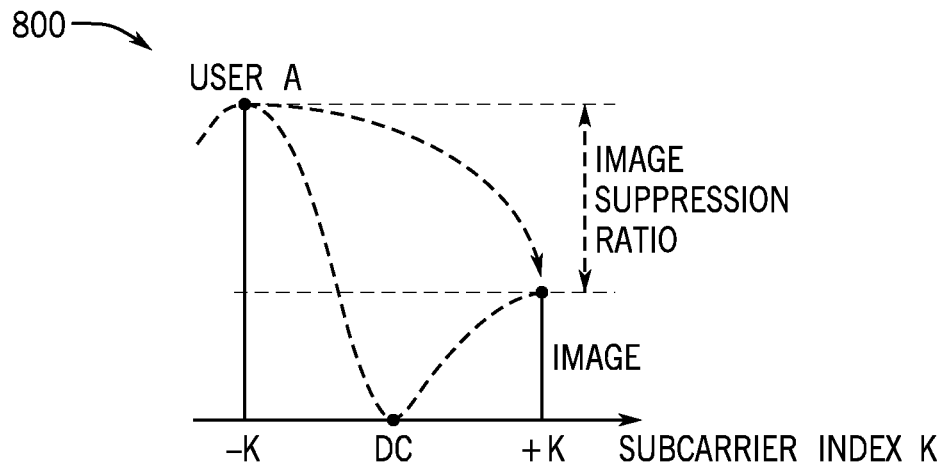
FIG. 8 is a schematic of another frequency spectrum illustrating inter-carrier interference arising from in-phase and quadrature-phase (IQ) mismatch, in accordance with an embodiment.

In particular, a frequency spectrum 800 depicted in FIG. 8 demonstrates the interference between wireless signals carried on symmetrical subcarriers (e.g., mirror subcarriers).

For example, the subcarrier −K may carry wireless signals transmitted and/or received by User A (e.g., $UE_a$). Because of loss in orthogonality of the wireless signal components due to IQ mismatching, the wireless signal of subcarrier −K may leak onto the symmetrical subcarrier +K and vice versa. In other words, when the IQ matches, the wireless signal carried on subcarrier −K may usually be a null (e.g., value of zero) at the symmetric subcarrier +K, such that the −K wireless signal does not project onto the subcarrier +K. As shown in the frequency spectrum 800, IQ mismatching may result in the wireless signal carried on subcarrier −K having a non-zero value at the mirror subcarrier +K and thus, a projection (e.g., image) of the −K wireless signal onto the subcarrier +K. Thus, aliasing (e.g., distortion) of wireless signals carried on the subcarriers −K and +K may occur, resulting in the loss of at least some information carried by these signals.

Figure 9:
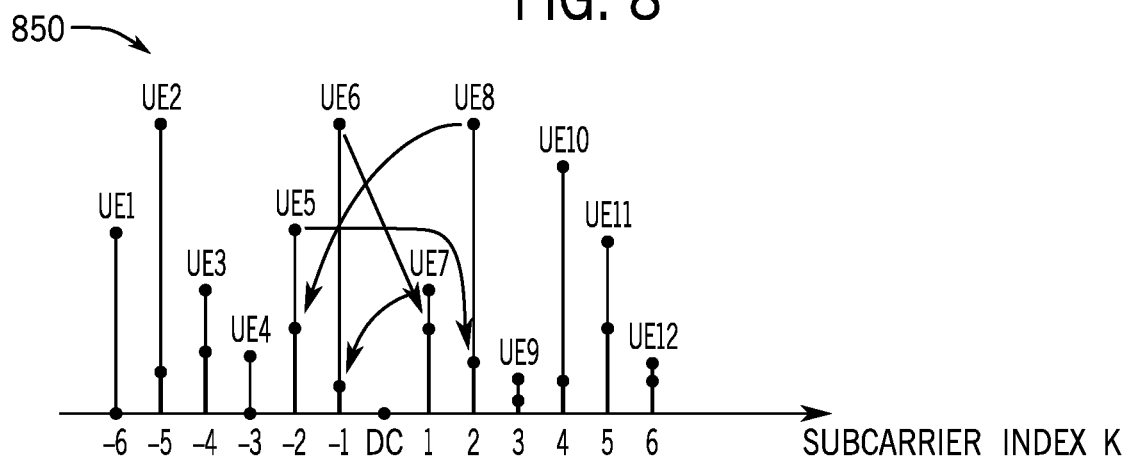
FIG. 9 is a schematic of another frequency spectrum illustrating the interference of wireless signals on symmetric subcarrier due to inter-carrier interference, in accordance with an embodiment.

Frequency spectrum 850 of FIG. 9 further depicts the impact of inter-channel interference caused by IQ mismatching on the frequency spectrum. As shown, subcarrier −1 may be symmetric to subcarrier 1 about the null DC subcarrier. When there is loss in orthogonality between wireless signals carried on symmetric subcarriers, the wireless signals may project onto their respective symmetric subcarrier, resulting in the aliasing of the wireless signals. For example, subcarrier −1 associated with user equipment 6 (UE6) may project an image of the wireless signal it carries onto symmetric subcarrier 1 associated with UE7, and vice versa. The images may result in distortion of the wireless signals originally carried by the subcarriers.

In some embodiments, a portion of the subcarriers may be shifted to create an asymmetric frequency spectrum for the physical resource block, such that inter-carrier interference due to IQ mismatch may be reduced or eliminated. By removing the symmetry between the subcarriers, the subcarriers may not overlap, and non-orthogonal wireless signals may not unintentionally project onto subcarriers mapped to different UEs.

Figure 10:
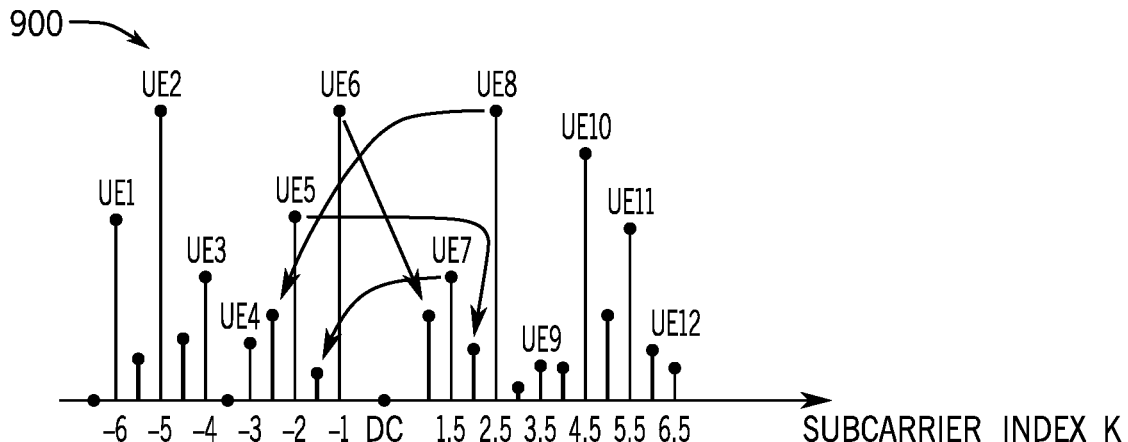
FIG. 10 is a schematic of another frequency spectrum illustrating an asymmetrical frequency spectrum that reduces or eliminates inter-carrier interference, in accordance with an embodiment.

FIG. 10 is an example of an asymmetric frequency spectrum 900 that avoids inter-carrier interference described above. In particular, when a UE is mapped to a subcarrier (e.g., subcarrier K), a subcarrier symmetric to the UE subcarrier may be shifted by some value (e.g., subcarrier K+/−A), such that the subcarriers are asymmetrically placed about a center point (e.g., the removed DC subcarrier) of the resource block's frequency spectrum. For example, UE1-UE6 may be mapped to subcarriers −1 through −6, as shown in FIG. 10. Rather than mapping UE7-UE12 to subcarriers that are symmetric (e.g., subcarriers 1 through 6) to mapped subcarriers −1 through −6, UE7-UE12 may be mapped to subcarriers 0.5 through 5.5, which are asymmetric to subcarriers −1 through −6. This may prevent interference of the wireless signals carried by different subcarriers when IQ mismatching occurs in processing received signals. By way of example, the wireless signal associated with UE6 may be mapped to subcarrier 1. However, because no wireless signal is being carried on subcarrier 1 for a UE, interference between the subcarriers may be avoided. In some embodiments, the displacement value (Δ) may be +/−0.5 to place the projected image in between two subcarriers, allowing for full recovery of the wireless signals in the presence of IQ mismatching. In some embodiments, the displacement value (Δ) may be restricted to be larger than inverse fast Fourier Transform (IFFT) and FFT resolution to prevent aliasing.

Figure 11:
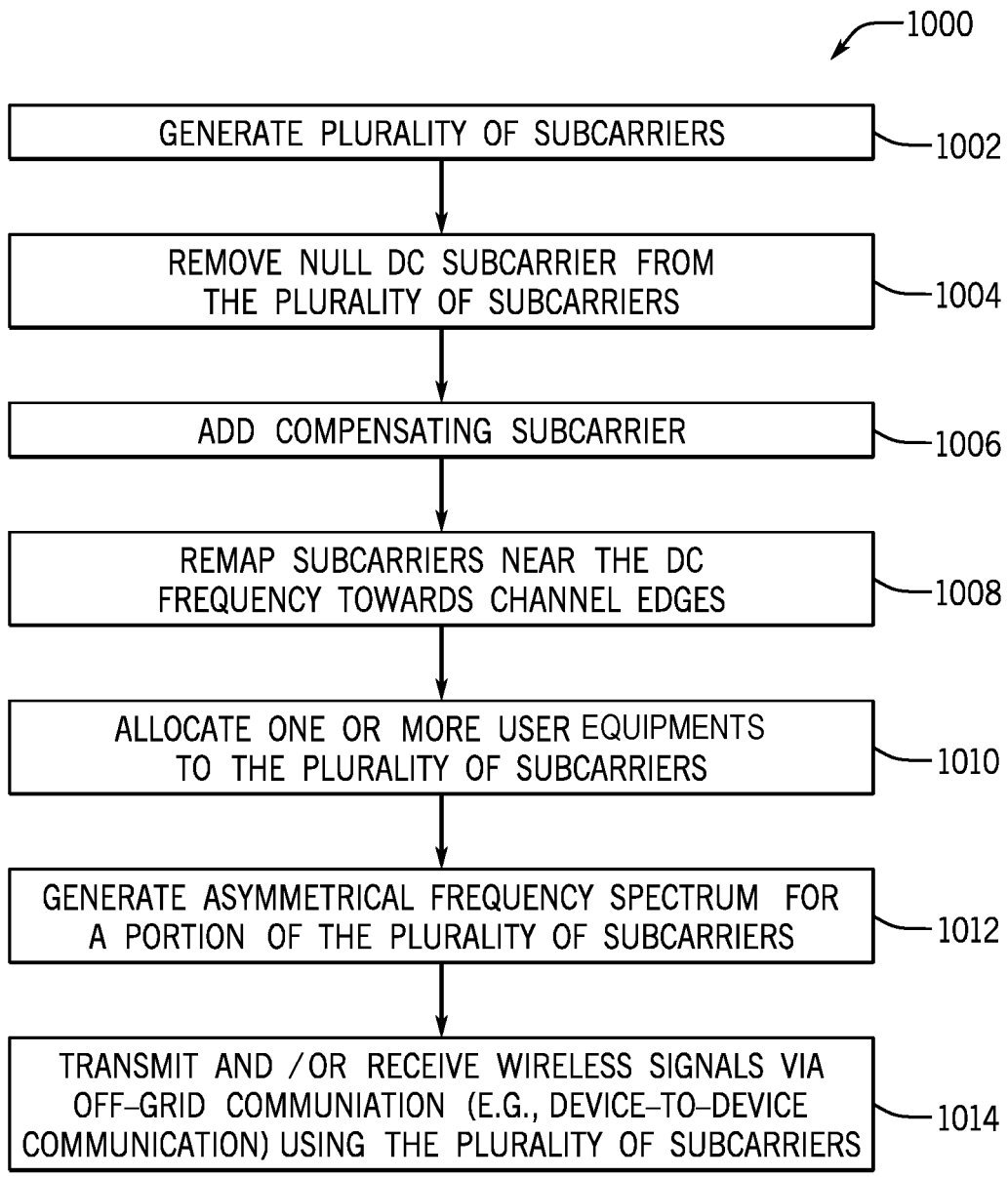
FIG. 11 is a flow chart of a process for configuring the radio frequency system to avoid inter-carrier interference, in accordance with an embodiment.

A process 1000 for configuring the radio frequency system 12 to avoid inter-carrier interference due to IQ mismatching and DC offset is described in FIG. 11, in accordance with an embodiment. While process 1000 is described according to a certain sequence, it should be understood that the present disclosure contemplates that the described steps may be performed in different suitable sequences than the sequence illustrated, and certain described steps may be skipped or not performed altogether. In some embodiments, the process 1000 may be implemented at least in part by executing instructions stored in a tangible, non-transitory, computer-readable medium, such as the memory 20, using processing circuitry, such as the processor core complex 18 or a separate controller designated for the radio frequency system 12. Additionally or alternatively, the process 1000 may be implemented at least in part by circuit connections and/or control logic implemented in an electronic device 10.

Generally, the process 100 may be initiated by generating a plurality of subcarriers for the channel (process block 1002). For example, the processor core complex 12 may instruct the radio frequency system 12 to divide (e.g., frequency multiplex) a channel with a bandwidth of 180 kHz into 12 subcarriers that are each 15 kHz apart and are capable of carrying a transmitting UE. The processor core complex 18 may then instruct the radio frequency system 12 to remove a null subcarrier for a data signal designated for transmittal to another electronic device 10 (process block 1004). For example, a null subcarrier at the DC frequency may be removed from the subcarriers of the physical resource block (e.g., channel) by avoiding transmission of one of the plurality of subcarriers near the center of the channel. Omitting the DC subcarrier may reduce the impact of DC offset on the frequency spectrum and thus, the appearance of inter-channel interference.

In some embodiments, the processor core complex 18 may also instruct the radio frequency system 12 to add a compensating subcarrier to maintain the number of subcarriers in the physical resource block and thus, to maintain total reception capacity (process block 1006). Subcarriers within a threshold range of the removed DC subcarrier may be remapped, upon instruction from the processor core complex 18, to outer edges of the channel to increase the gap around the DC frequency and thus, to further reduce impact of the DC offset and to relax performance constraints on receiver architecture (process block 1008).

The processor core complex 18 may further allocate one or more user equipments to at least a portion of the plurality of subcarriers (process block 1010). For example, the processor complex 18 may map a transmitting user equipment to each of the subcarriers of the channel. As another example, the processor core complex 18 may map user equipments to a first portion of the plurality of subcarriers and may map use equipment to a second portion of the plurality of subcarriers after frequency position of the subcarriers of the second portion are adjusted to generate an asymmetrical frequency spectrum. Thus, the processor core complex 18 may also instruct the transceiver circuit to generate the asymmetrical frequency spectrum for the channel by shifting a portion (e.g., the second portion) of the plurality of subcarriers (process block 1012). By way of example, a portion of the subcarriers may be shifted by a displacement value (Δ), such that the subcarriers are no longer symmetric about the DC frequency (e.g., frequency location of the null DC subcarrier). By doing so, the subcarriers may no longer overlap, and wireless signals carried on the subcarriers may not interfere with one another.

After the frequency spectrum is configured to reduce inter-carrier interference between subcarriers, the radio frequency system 12 may be ready to communicate with other electronic devices via D2D communication using NB-IoT wireless standards (process block 1014). As such, the processor core complex 18 may then signal to the radio frequency system 12 to transmit and/or receive wireless signals via D2D communication using the configured frequency spectrum.

By employing the techniques described above, the radio frequency system 12 may avoid distortion of received wireless signal due to inter-channel interference arising from DC offset and IQ mismatching. The present techniques provide DC offset compensation and better tolerance of IQ mismatching by the radio frequency system 12, enabling implementation of receiver architecture that is relatively cheap and relaxed on IQ matching constraints. Further, the techniques may avoid interference between wireless signals carried on subcarriers and may fully recover the wireless signals even in the presence of IQ mismatching.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a radio frequency system configured to wirelessly transmit and receive data;
a processor communicatively coupled to a transceiver circuit, wherein the processor is configured to:
instruct the transceiver circuit to generate a first subcarrier and a second subcarrier associated with data signals prior to being transmitted, wherein a null subcarrier placed at a center between the first subcarrier and the second subcarrier is removed, wherein the first subcarrier and the second subcarrier are symmetrically placed at an equal frequency apart from the removed null subcarrier;
instruct the transceiver circuit to generate an asymmetrical frequency spectrum by maintaining frequency of the first subcarrier and adjusting frequency of the second subcarrier by a displacement value; and
instruct the transceiver circuit to transmit the data signals on the first subcarrier and the second subcarrier to another electronic device.

2. The electronic device of claim 1, wherein the transceiver circuit is configured to remove the null subcarrier by avoiding transmission of the data signals on one of the first subcarrier or the second subcarrier at a center of a channel used to transmit the data signals.

3. The electronic device of claim 1, wherein the processor is configured to instruct the transceiver circuit to add a compensating subcarrier at an edge of a channel used to transmit the data signals.

4. The electronic device of claim 1, wherein the processor is configured to instruct the transceiver circuit to remap the first subcarrier, the second subcarrier, or a combination thereof, to one or more edges of a channel used to transmit the data signals in response to the first subcarrier, the second subcarrier, or a combination thereof, being within a threshold range of frequencies from the null subcarrier.

5. The electronic device of claim 1, wherein instructing the transceiver circuit to generate the asymmetrical frequency spectrum comprises:

determining, via the processor, a first mapping of one or more user equipment to the first subcarrier of a channel used to transmit the data signals;
determining, via the processor, a second mapping of one or more additional user equipment to the second subcarrier based on the adjusted frequency of the second subcarrier; and
instructing, via the processor, the transceiver circuit to transmit the data signals on the first subcarrier and the second subcarrier according to the first mapping and the second mapping to the other electronic device.

6. The electronic device of claim 1, wherein the transceiver circuit is configured to transmit the data signals on the first subcarrier and the second subcarrier to the other electronic device via Device-to-Device (D2D) communication.

7. The electronic device of claim 1, wherein the transceiver circuit comprises a zero-intermediate frequency (IF) receiver architecture.

8. A method, comprising:
generating, via a transceiver circuit, a plurality of subcarriers associated with a data signal, wherein the plurality of subcarriers is configured to transmit the data signal along a narrowband transmission channel;
removing, via the transceiver circuit, a null subcarrier of the plurality of subcarriers, wherein the null subcarrier is located at a direct current (DC) frequency;
generating, via the transceiver circuit, an asymmetrical frequency spectrum for a portion of the plurality of subcarriers, wherein the plurality of subcarriers is centered about the DC frequency, wherein generating the asymmetrical frequency spectrum comprises adjusting, via the transceiver circuit, a frequency of each subcarrier of the portion of the plurality of subcarriers by a displacement value, wherein the portion of the plurality of subcarriers is symmetrical to an additional portion of the plurality of subcarriers with respect to the DC frequency prior to the adjustment; and
transmitting, via the transceiver circuit, the plurality of subcarriers to at least one user equipment of a plurality of user equipments.

9. The method of claim 8, wherein generating the plurality of subcarriers comprises dividing the narrowband transmission channel according to a frequency-multiplexing scheme.

10. The method of claim 8, wherein removing the null subcarrier of the plurality of subcarriers comprises avoiding transmission of one of the plurality of subcarriers at the DC frequency of the narrowband transmission channel used to transmit the data signal.

11. The method of claim 8, wherein each subcarrier of the portion and of the additional portion corresponds to a user equipment of the plurality of user equipments configured to communicate with another user equipment of the plurality of user equipments via the narrowband transmission channel.

12. The method of claim 8, wherein transmitting the plurality of subcarriers to the at least one user equipment comprises transmitting the plurality of subcarriers via Device-to-Device (D2D) communication.

13. The method of claim 8, comprising adding, via the transceiver circuit, a compensating subcarrier to the plurality of subcarriers at an edge of the narrowband transmission channel.

14. The method of claim 8, comprising remapping an additional portion of the plurality of subcarriers within a threshold range of the DC frequency to one or more edges of the narrowband transmission channel.

15. A non-transitory machine-readable medium, comprising computer-executable instructions, when executed, are configured to cause a processor to:
  generate a plurality of subcarriers associated with a data signal, wherein the plurality of subcarriers is configured to transmit the data signal along a narrowband transmission channel;
  remove a null subcarrier of the plurality of subcarriers, wherein the null subcarrier is located at a direct current (DC) frequency;
  generate an asymmetrical frequency spectrum for a portion of the plurality of subcarriers, wherein the plurality of subcarriers is centered about the removed null subcarrier, wherein generating the asymmetrical frequency spectrum comprises adjusting a frequency of each subcarrier of the portion of the plurality of subcarriers by a displacement value, wherein the portion of the plurality of subcarriers is symmetrical to an additional portion of the plurality of subcarriers with respect to the DC frequency prior to the adjustment; and
  transmit the plurality of subcarriers to at least one user equipment of a plurality of user equipments.

16. The non-transitory machine-readable medium of claim 15, wherein the plurality of subcarriers is transmitted to the at least one user equipment via a zero-intermediate frequency (IF) architecture.

17. The non-transitory machine-readable medium of claim 15, wherein each subcarrier of the portion and of the additional portion corresponds to a user equipment of the plurality of user equipments configured to communicate with another user equipment of the plurality of user equipments via the narrowband transmission channel.

18. The non-transitory machine-readable medium of claim 15, wherein transmitting the plurality of subcarriers to the at least one user equipment comprises transmitting the plurality of subcarriers via Device-to-Device (D2D) communication.

* * * * *